United States Patent [19]

Brambilla

[11] Patent Number: 5,102,325

[45] Date of Patent: Apr. 7, 1992

[54] MACHINE FOR MANUFACTURING EXTRUDED TUBES

[75] Inventor: Romano Brambilla, Modena, Italy

[73] Assignee: Brabor S.r.l., Ubersetto Di Fiorano, Italy

[21] Appl. No.: 512,431

[22] Filed: Apr. 23, 1990

[30] Foreign Application Priority Data

Apr. 28, 1989 [IT] Italy ............................. 20299 A/89

[51] Int. Cl.⁵ ................................................. B29C 47/92
[52] U.S. Cl. ................................... 425/140; 264/40.7; 264/209.5; 425/150; 425/169
[58] Field of Search .............. 425/141, 150, 140, 169; 264/40.1, 40.3, 40.7, 209.1, 209.5

[56] References Cited

U.S. PATENT DOCUMENTS

| | | | |
|---|---|---|---|
| 2,940,126 | 6/1960 | Sheridan | 425/141 |
| 3,125,616 | 3/1964 | Cook et al. | 264/40.6 |
| 3,502,752 | 3/1970 | Brown | 425/141 |
| 3,982,440 | 9/1976 | Groleau et al. | 264/40.1 |
| 4,069,292 | 1/1978 | Herrington et al. | 264/40.3 |
| 4,520,672 | 6/1985 | Saint-Amour | 425/141 |
| 4,597,729 | 7/1986 | Singh et al. | 425/150 |
| 4,882,104 | 11/1989 | Dobrowsky | 264/40.7 |
| 4,886,438 | 12/1989 | Börger et asl. | 425/141 |

FOREIGN PATENT DOCUMENTS

| | | | |
|---|---|---|---|
| 45-3954 | 2/1970 | Japan | 264/326.1 |
| 56-4436 | 1/1981 | Japan | 264/565 |
| 1324858 | 7/1987 | U.S.S.R. | 264/326.1 |

Primary Examiner—Richard L. Chiesa
Assistant Examiner—W. Matney, Jr.
Attorney, Agent, or Firm—Guido Modiano; Albert Josif

[57] ABSTRACT

The machine has a tube extrusion head, an entrainment device arranged downstream of the extrusion head along the extrusion direction, and a device for checking the outer diameter of the tube. The device for checking the outer diameter of the tube includes a pneumatic gauge which is interposed between the extrusion head and the entrainment device and is operatively connected to an electronic control unit which acts on the entrainment device to adjust the tube entrainment speed as a function of the outer diameter of the tube to be obtained.

2 Claims, 2 Drawing Sheets

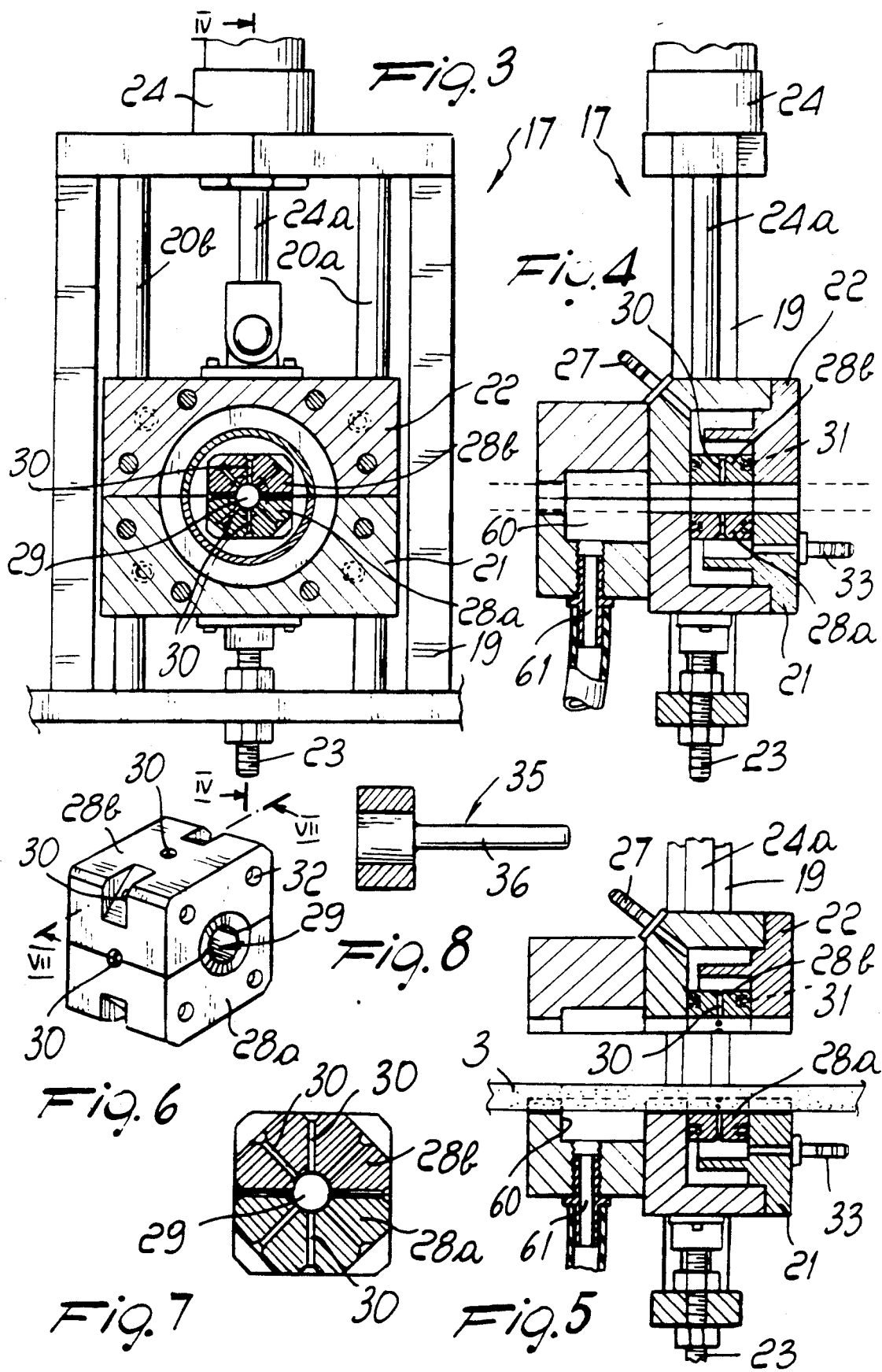

MACHINE FOR MANUFACTURING EXTRUDED TUBES

BACKGROUND OF THE INVENTION

The present invention relates to a machine for manufacturing extruded tubes made of synthetic and non-synthetic material, particularly for small-diameter polyvinylchloride tubes, for example of the kind used in medical applications for providing dialysis circuits and others.

Machines for the production of polyvinylchloride tubes intended for the most disparate types of use are known which substantially comprise an extrusion head inside which a passage for the semi-liquid or pasty synthetic material is defined which opens outward through a gauged hole. A male element of the head is arranged inside the passage for the synthetic material and extends coaxially in said passage until it is proximate to the gauged exit hole. A channel is defined in the extrusion head and in the related male element, is fed with air at a preset pressure and is open outward at the end of the male element which is arranged proximate to the gauged exit hole. At the beginning of extrusion, in the case of low-thickness tubes, the first portion of the tube extruded through the gauged exit hole is closed, for example by pressing, so that during extrusion the inside of the tube is pressurized by the air fed into said channel; the pressure of said air is determined according to the dimensions of the tube to be obtained.

In the case of tubes with higher thickness, the pressurization operation becomes unnecessary.

At the exit from the extrusion head, the tube is inserted in a channel in which a cooling liquid, for example water, is contained, and is subsequently engaged by entraining means which exert a traction on the tube which is proportional in extent to the outer diameter of the tube to be obtained. In practice, by keeping the air pressure constant inside the tube, if it is pressurized, it is possible to vary its internal and external diameter according to the requirements simply by varying its entrainment speed.

In the manufacture of polyvinylchloride tubes which are intended to engage coupling sleeves in which the seal between the sleeve and the tube is provided on the outer surface of the tube, the outer diameter of said tube and even more particularly its external circumference must be provided with extreme precision.

Due to this requirement, machines intended for the production of these kinds of tubes are equipped with checking devices which are interposed between the extrusion head and the entrainment means and constantly check the external diameter of the tube. Such checking devices are generally constituted by optical gauges which sense the diameter of the tube by emitting a light beam in a direction which is perpendicular to its axis or which, as in the case of laser light devices, measure two diameters of the tube which are arranged substantially perpendicular to one another.

Such known types of checking devices, while allowing a satisfactory measurement of the diameter of the tube in terms of dimensions, have some disadvantages.

An optical measurement of the diameter of the tube is in fact capable of sensing possible surface irregularities of the tube only when such surface irregularities affect the diametrically opposite regions of the surface at which the measurement is performed. When said surface irregularities affect regions of the tube which are not affected by the measurement, these irregularities are not sensed. Even in the case of checking devices which perform a double measurement, sensing two mutually perpendicular diameters, the possible presence of surface irregularities on the regions not affected by these measurements is not sensed by the device.

The uniformity of the outer surface of the tube is extremely important, by virtue of the fact that the seal between the tube and the sleeves is generally obtained by gluing on the outer surface of the tube. Due to this fact, the correct coupling between the sleeve and the tube can be compromised, not only when the dimensions of the tube are outside a preset tolerance range but also when irregularities occur on the outer surface of the tube though dimensional tolerances are met. Besides, as regards the correct coupling between the tube and the sleeve, the possible oval configuration of the tube is scarcely important, since the tube is made of elastically flexible material and is therefore capable of assuming a correct cylindrical configuration once it is inserted in the sleeve.

Another disadvantage which can be observed in optical control devices is related to their cost, as well as to the great precision required in adjusting these devices.

SUMMARY OF THE INVENTION

The aim of the present invention is to obviate the above described disadvantages by providing a machine for the manufacture of extruded tubes made of synthetic and nonsynthetic material, provided with a device for checking the external diameter of the tube which can sense not only dimensional irregularities but surface irregularities as well.

Within the scope of this aim, an object of the invention is to provide a machine in which the checking device is easy to provide with modest production costs.

Another object of the invention is to provide a machine which constantly checks the tube during its extrusion and allows the timely intervention of an operator if dimensional or surface irregularities exceeding the preset tolerances are sensed.

A further object of the invention is to provide a machine in which the air pressure inside the tube can be checked effectively during extrusion so as to avoid sharp pressure deviations from the required theoretical value.

This aim, these objects and others which will become apparent hereinafter are achieved by a machine for the manufacture of extruded tubes made of synthetic and non-synthetic material, in particular for small-diameter polyvinylchloride tubes, which comprises: a tube extrusion head, entrainment means arranged downstream of said extrusion head along the extrusion direction, and means for checking the outer diameter of said tube, characterized in that said means for checking the outer diameter of the tube comprise a pneumatic gauge interposed between said extrusion head and said entrainment means and operatively connected to an electronic control unit which acts on said entrainment means to adjust the entrainment speed of the tube according to the outer diameter of the tube to be obtained.

BRIEF DESCRIPTION OF THE DRAWINGS

Further characteristics and advantages of the invention will become apparent from the description of a preferred but not exclusive embodiment of the machine according to the invention, illustrated only by way of non-limitative example in the accompanying drawings, wherein:

FIG. 3 is a partially sectional front elevation view of the checking means according to the invention, taken in a plane which is perpendicular to the axis of the tube;

FIGS. 4 and 5 are sectional views of FIG. 3 taken along the axis IV—IV, illustrating the operation of the checking means;

FIG. 6 is a perspective view of a detail of the checking means;

FIG. 7 is a sectional view of FIG. 6 taken along the axis VII—VII; and

FIG. 8 is a lateral elevation view of an element with which the checking means according to the invention are equipped.

DESCRIPTION OF THE PREFERRED EMBODIMENTS

Figure 1:
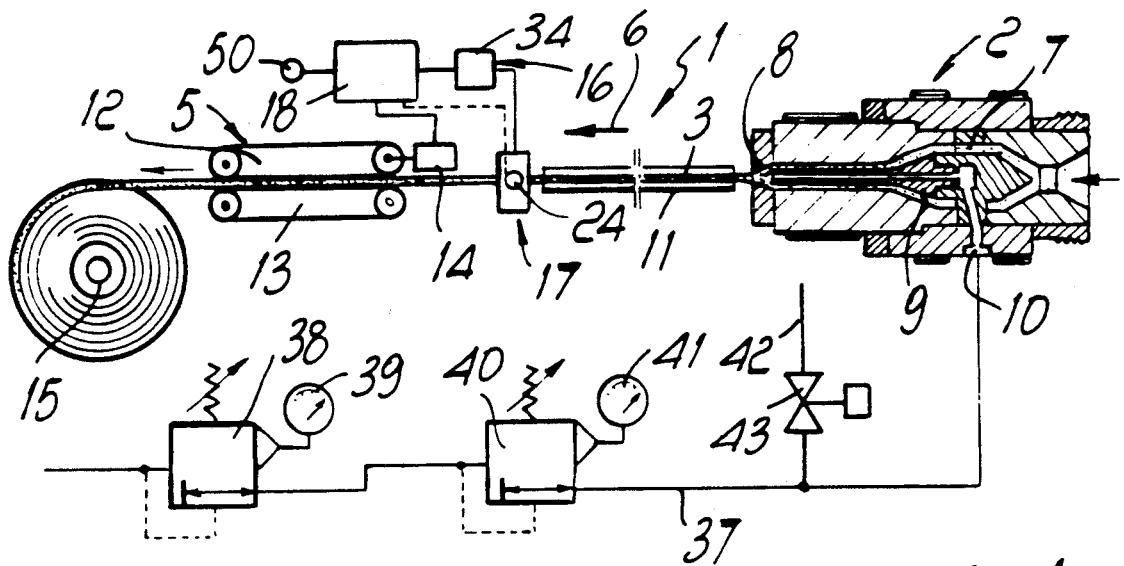
FIG. 1 is a schematic view of the machine according to the invention.
Figure 2:
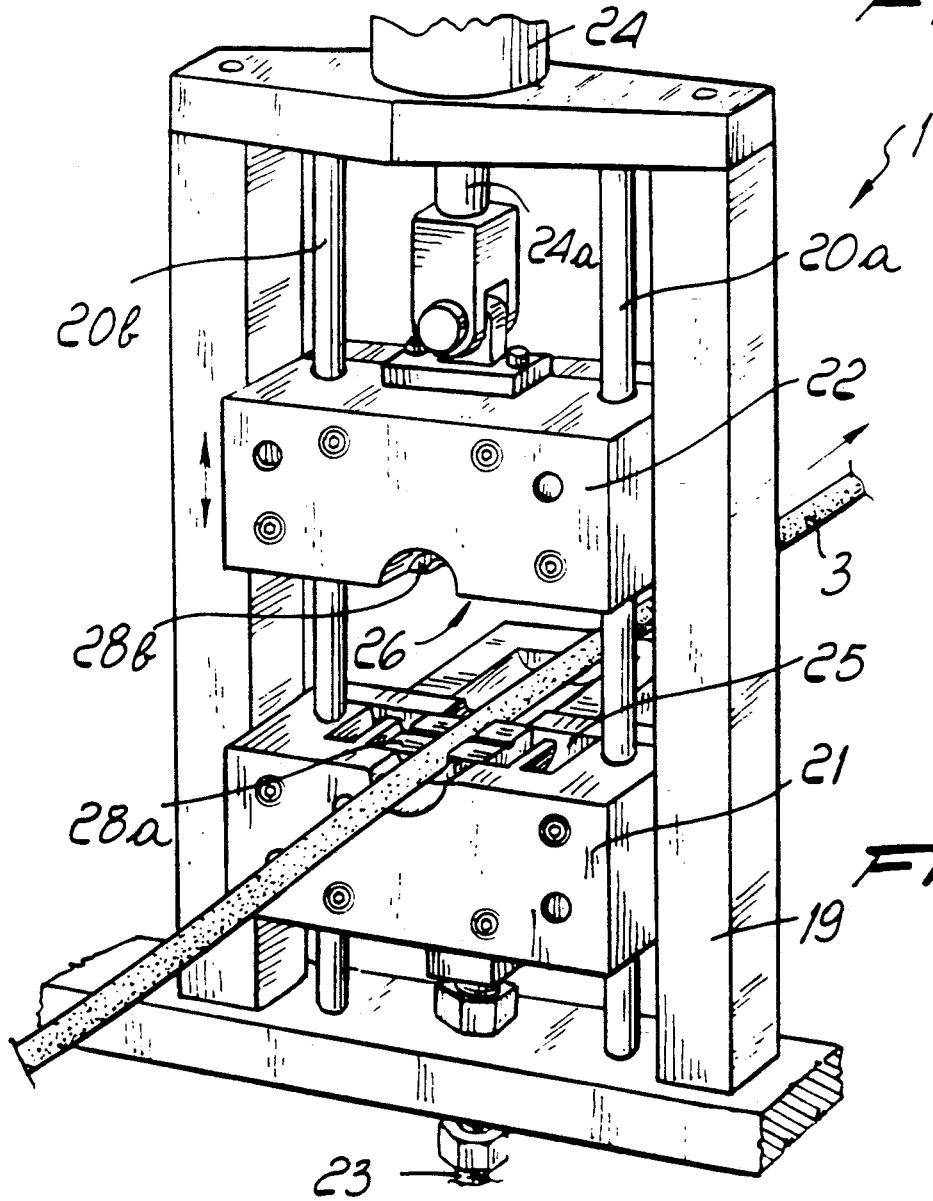
FIG. 2 is a schematic perspective view of the checking means according to the invention.

With reference to the above figures, the machine according to the invention, generally indicated by the reference numeral 1, comprises: a head 2 for the extrusion of the tube 3 which is provided, if required, with means for the delivery of pressurized air inside the tube which are indicated by the reference numeral 4, and means 5 for entraining the tube which are arranged downstream of the extrusion head 2 along the direction of extrusion indicated by the arrow 6.

More particularly, a passage 7 for the synthetic material is defined inside the extrusion head 2 in a known manner and opens outward at a longitudinal end of the head through a gauged hole 8. The male element 9 of the head is arranged in the passage 7 and extends coaxially inside the passage 7 until it is proximate to the gauged hole 8.

A channel 10 is defined in the body of the extrusion head 2 and in the related male element 9, is fed with pressurized air by means of the delivery means 4, and opens outward at the gauged hole 8.

Means 11 for cooling the tube are provided immediately downstream of the extrusion head 2 and can be constituted in a known manner by a channel in which the tube 3 advances while being immersed in water.

The entrainment means 5 are conveniently constituted by a pair of closed-loop belts or tracks 12 and 13 which are arranged mutually facing along the extrusion direction and are actuated by a known variable-speed motor 14. The tracks 12 and 13 engage the tube 3 on opposite sides so as to advance it parallel to the extrusion direction 6 and convey the tube to a winding spool 15.

The machine comprises means generally indicated by the reference numeral 16 for checking the outer diameter of the tube which comprise, according to the invention, a pneumatic gauge 17 interposed between the extrusion head 2 and the entrainment means 5 and is operatively connected to an electronic control unit 18 which in turn acts on the entrainment means to adjust the entrainment speed of the tube according to the outer diameter of the tube to be obtained.

More particularly, the pneumatic gauge 17 comprises a supporting frame 19 which is fixed to the supporting structure of the machine, not illustrated for the sake of simplicity, and is provided with a pair of mutually parallel vertical guides 20a and 20b. A lower body 21 and an upper body 22 are slidable along the vertical guides 20a and 20b and are mutually associable in a substantially horizontal plane which passes through the axis of the tube 3.

The lower body 21 is blocked at a preset level, according to the diameter of the tube to be checked, by means of an adjustment screw 23 which couples it to the supporting frame 19.

The upper body 22 is controllably movable along the vertical guides 20a and 20b by virtue of the action of actuation means constituted by a double-action pneumatic jack 24; the body of said jack is fixed to the supporting frame 19 and its stem 24a acts on the upper body 22 so as to move it closer or further apart with respect to the lower body 21.

Two half-cavities 25 and 26 are defined on the mutually facing faces of the lower body and of the upper body and constitute, when the bodies 21 and 22 are coupled, a chamber which is fed with compressed air through an inlet 27.

The two halves 28a and 28b of a block are accommodated in the half-cavities 25 and 26; a gauged cylindrical passage 29 is defined in said block, is crossed by the tube 3 in an axial direction and with play and has a plurality of channels 30 which pass through the block body and open onto the lateral surface of the cylindrical passage 29 along a circumference which is concentric to the tube 3. The two halves 28a and 28b of the block are arranged correctly in a removable manner inside the related half-cavities 25 and 26 by means of pins 31 of the bodies 21 and 22 which couple in seats 32 defined on the front faces of the block.

The chamber defined by the half-cavities 25 and 26 is connected, through an outlet 33, in input to a transducer 34 which converts the pneumatic signal into an electric signal and is connected in output to the electronic control unit 18.

The machine according to the invention can be equipped with a series of blocks for the pneumatic gauge which have passages 29 of different sizes according to the diameter of the tube to be checked. Each block can furthermore be equipped with a gauged pin 35, of the kind illustrated in FIG. 8, which has a cylindrical stem 36 the diameter whereof coincides with the theoretical diameter of the tube to be measured in order to perform the setting of the pneumatic gauge at the beginning of extrusion, as will become apparent hereinafter.

A chamber 60 which is provided downward with a discharge 61 is advantageously defined in the lower body 21 and in the upper body 22, upstream of the block constituted by the two halves 28a and 28b along the extrusion direction, and water and any impurities carried along by the tube 3 are collected therein.

The electronic control unit 18 can be operatively connected to the extrusion head 2 to adjust the feeding speed of the material through the extrusion head and to the pneumatic feed line of the pneumatic jack 24 to actuate the opening of the pneumatic gauge 17 in case of need, as will become apparent hereinafter.

The compressed-air delivery means 4 are constituted by a feed duct 37 which is connected to the channel 10 and along which the following are arranged in series: a first controllable adjustment valve 38 equipped with a related pressure gauge 39, by means of which it is possible to reduce the air pressure to values adapted for feeding the tube during extrusion, and a second controllable adjustment valve 40 equipped with a related pressure gauge 41 provided with greater sensitivity than the pressure gauge 39, by means of which it is possible to perform a high-precision adjustment of the pressure of the air fed to the extrusion head. A vent duct 42 is provided downstream of the second adjustment valve 40 and is connected in parallel to the branch of the duct 37 which feeds the extrusion head: a cutoff valve 43 is arranged on said duct 42 and is kept open in normal operating conditions. Though said vent duct 42 causes a constant loss of pressure in the air which supplies the extrusion head, it is advantageous, since any accidental increases in pressure inside the tube during extrusion are buffered by the outflow of air through said duct 42. The cutoff valve 43 is closed only when the pressure inside the duct 37 is, for accidental reasons, barely sufficient to ensure correct pressurization of the tube 3.

The operation of the machine according to the invention is as follows.

Before extrusion begins, the pneumatic gauge 17 is equipped with a block, constituted by the two halves 28a and 28b, which has a gauged passage 29 more suitable for its checking. The cylindrical stem 36 of the gauged pin 35 is inserted in the gauged passage 29 so as to perform the calibration of the electronic control unit 18, which is programmed with the values of the tolerances allowed for each nominal diameter of the tube to be checked.

At this point the extrusion of the tube 3 begins; said tube is conveyed into the cooling channel 11. through the bodies 21 and 22, with the body 22 in raised position, and then between the entrainment means 5 up to the winding spool 15. The entrainment means 5 are actuated and the upper body 22 is moved to couple with the lower body 21 so that the tube 3 is surrounded by the gauged passage 29.

By feeding the chamber defined by the half-cavities 25 and 26 with air kept at constant pressure, the transducer 34 senses a pressure which is lower than the feed pressure and varies as a function of the diameter variations of the tube 3. A decrease in the diameter of the tube in fact produces a greater dissipation of air through the channels 30 and through the cylindrical passage 29, causing a decrease in the pressure sensed by the transducer 34, whereas an increase in the diameter of the tube 3 causes an increase in the sensed pressure.

The value of the pressure sensed by means of the transducer 34 is transmitted to the electronic control unit 18, which compares it to the adjustment pressure which corresponds to the value of the nominal diameter of the tube 3 and acts on the motor 14 of the entrainment means 5 so as to increase or decrease the advancement speed of the tube 3 and therefore adequately vary the outer diameter of the tube 3.

If the pressure variation sensed by the transducer 34 is greater than the maximum variation allowed according to the tolerances preset in the electronic control unit 18, said control unit 18 warns the operator, by means of a known acoustic or visual signaling device 50, of the sensed defect so as to allow the operator to promptly intervene in order to intercept the section of tube in which this anomaly is present. The electronic control unit 18 furthermore causes the opening of the pneumatic gauge 17 to facilitate the intervention of the operator.

The electronic control unit 18 can furthermore be equipped with a printing device which is connected to the transducer 34 so as to continuously plot the diameter of the tube for its entire length.

It should be furthermore noted that the pneumatic gauge 17 is capable of sensing not only dimensional anomalies of the tube 3 but is also capable of sensing the presence of any surface irregularities of the tube 3, since such irregularities, regardless of their position, produce a variation in the pressure sensed by the transducer 34 when they pass through the gauged passage 29.

If the extent of said surface irregularities or the sensed pressure variations which correspond to said irregularities is higher than the maximum allowed tolerances, the electronic control unit 18 promptly signals the anomaly, as already described above.

In practice it has been observed that the machine according to the invention fully achieves the intended aim, since it allows to check not only the outer diameter of the tube but also to sense the possible presence of surface irregularities, regardless of their position on the outer surface of the tube.

Another advantage which derives from the use of the pneumatic gauge is that of obtaining, simultaneously with the checking of the outer diameter of the tube, an excellent surface cleaning thereof, avoiding stagnation of water which would cause calcareous deposits on its outer surface.

Though the machine according to the invention has been conceived in particular for the production of small-diameter polyvinylchloride extruded tubes, the concept underlying the present invention may also be successfully applied in extrusion machines for other kinds of synthetic and non-synthetic materials.

The machine thus conceived is susceptible to numerous modifications and variations, all of which are within the scope of the inventive concept; all the details may furthermore be replaced with technically equivalent elements.

In practice, the materials employed, as well as the dimensions, may be any according to the requirements and the state of the art.

I claim:

1. Machine for the manufacture of extruded tubes made of synthetic and non-synthetic material comprising: a tube extrusion head, means for cooling the extruded tubes arranged immediately downstream of said tube extrusion head along the direction of extrusion, entrainment means arranged downstream of said means for cooling, and means for checking the outer diameter of the extruded tube interposed between said means for cooling and said entrainment means, wherein said means for checking the outer diameter of the extruded tube comprise a pneumatic gauge, said machine further comprising a variable speed means connected to said entrainment means for allowing variations of the entrainment speed thereof, an electronic control unit operatively connected to said variable speed means, and a transducer means interconnected between said pneumatic gauge and said electronic control unit for converting an input signal from said pneumatic gauge to an output signal to said electronic control unit, said electronic control unit adjusting the entrainment speed of said entrainment means as a function of the outer diameter of the extruded tube checked by said pneumatic gauge, said pneumatic gauge comprising a block which defines a gauged cylindrical passage which is axially traversable with play by the extruded tube, said block being provided with a plurality of channels which open onto the lateral surface of said cylindrical passage, said channels being feedable with compressed air, said transducer sensing pressure changes resulting from changes in the outer diameter of the extruded tube, said pneumatic gauge further comprising an upper body and a lower body being slidably supported on vertical guides, said upper and lower bodies being relatively slidable between an open position and a closed position thereof, said upper and lower bodies being provided with mutually facing half-cavities, a chamber being defined by said half-cavities when said upper and lower bodies are in said closed position, said chamber being feedable with compressed air, said block being provided in two block halves which mutually face each other along a coupling plane which passes through the axis of said passage, each one of said two block halves of said block being accommodated in a respective one of said half-cavities of said upper and lower bodies, actuation means being provided which act on at least one of said upper and lower bodies with said block halves accommodated therein for positioning the mutual spacing of said upper and lower bodies.

2. Machine according to claim 1, wherein said actuation means comprise a fluid-actuated jack acting on said upper body, a signal device being furthermore provided for warning the machine operator of an anomaly in size of the outer diameter of the extruded tube, said signal device being connected to said electronic control unit.

* * * * *